US010907015B2

(12) United States Patent
Bruggeman et al.

(10) Patent No.: US 10,907,015 B2
(45) Date of Patent: Feb. 2, 2021

(54) METHOD FOR PRODUCING MOISTURE-SENSITIVE PRODUCTS

(71) Applicant: SOUDAL, Turnhout (BE)

(72) Inventors: Peter Bruggeman, Turnhout (BE); Peter Geboes, Aartselaar (BE); Luc Loos, Turnhout (BE); Ulric Beliën, Laakdaal (BE); Bob Laurent, Turnhout (BE); Dave Van Den Plas, Kalmthout (BE); Evelien De Backer, Putte (BE); Dominique Wouters, Gierle (BE)

(73) Assignee: SOUDAL, Turnhout (BE)

(*) Notice: Subject to any disclaimer, the term of this patent is extended or adjusted under 35 U.S.C. 154(b) by 171 days.

(21) Appl. No.: 16/096,652

(22) PCT Filed: Apr. 26, 2017

(86) PCT No.: PCT/IB2017/052401
§ 371 (c)(1),
(2) Date: Oct. 25, 2018

(87) PCT Pub. No.: WO2017/187356
PCT Pub. Date: Nov. 2, 2017

(65) Prior Publication Data
US 2019/0218347 A1    Jul. 18, 2019

(30) Foreign Application Priority Data
Apr. 28, 2016   (BE) .................................. 2016/5297

(51) Int. Cl.
| C08G 77/38 | (2006.01) |
| C08J 3/20 | (2006.01) |
| C09D 5/34 | (2006.01) |
| C09D 183/04 | (2006.01) |
| B65B 3/00 | (2006.01) |
| B65B 63/00 | (2006.01) |
| B01F 7/00 | (2006.01) |
| B01J 19/00 | (2006.01) |
| B01J 19/18 | (2006.01) |
| C08J 3/24 | (2006.01) |
| C08K 3/34 | (2006.01) |
| C08K 5/5435 | (2006.01) |
| C09J 11/04 | (2006.01) |
| C09J 11/06 | (2006.01) |
| C09J 183/04 | (2006.01) |
| C09K 3/10 | (2006.01) |
| C08G 77/16 | (2006.01) |

(52) U.S. Cl.
CPC .......... *C08G 77/38* (2013.01); *B01F 7/00208* (2013.01); *B01F 7/00716* (2013.01); *B01J 19/0066* (2013.01); *B01J 19/18* (2013.01); *B65B 3/00* (2013.01); *B65B 63/00* (2013.01); *C08J 3/20* (2013.01); *C08J 3/203* (2013.01); *C08J 3/24* (2013.01); *C08K 3/34* (2013.01); *C08K 5/5435* (2013.01); *C09D 5/34* (2013.01); *C09D 183/04* (2013.01); *C09J 11/04* (2013.01); *C09J 11/06* (2013.01); *C09J 183/04* (2013.01); *C09K 3/1018* (2013.01); *B01F 2215/006* (2013.01); *C08G 77/16* (2013.01); *C08G 2190/00* (2013.01); *C08J 2383/06* (2013.01); *C08K 2003/343* (2013.01); *C09K 2200/0645* (2013.01)

(58) Field of Classification Search
CPC .................................. B65B 3/00; B65B 63/00
USPC ................................................ 53/428, 111 R
See application file for complete search history.

(56) References Cited

U.S. PATENT DOCUMENTS

| 3,814,289 | A | * | 6/1974 | Robbins | .............. | B01F 15/0237 |
| | | | | | | 222/135 |
| 4,268,452 | A | * | 5/1981 | Mine et al. | ............ | C08K 3/013 |
| | | | | | | 524/860 |
| 4,334,784 | A | * | 6/1982 | Engels | ................ | B01F 15/0429 |
| | | | | | | 222/135 |
| 4,867,312 | A | * | 9/1989 | Comert et al. | ......... | B65D 53/06 |
| | | | | | | 206/447 |

(Continued)

FOREIGN PATENT DOCUMENTS

| BE | 382 657 A1 | 10/1980 |
| EP | 0 802 222 A1 | 10/1997 |

(Continued)

OTHER PUBLICATIONS

Whip Mix Corporation, "Combination Unit (Model D) and Vacuum Power Mixer Plus (Model F)," date Feb. 2012, 12 pages. (Year: 2012).*

International Search Report dated Sep. 19, 2017, issued in corresponding International Application No. PCT/IB2017/052401, filed Apr. 26, 2017, 4 pages.

(Continued)

*Primary Examiner* — Stephen F. Gerrity
(74) *Attorney, Agent, or Firm* — Christensen O'Connor Johnson Kindness PLLC

(57) ABSTRACT

Described is a method for the production of a moisture curable composition whereby the reactive end groups of a reactive polymer are reacted with a cross-linking agent for forming a prepolymer, whereby the method is operated in batch mode and the production of the prepolymer occurs in a mixing vessel, characterized in that the reactive polymer and the cross-linking agent, as well as the additional ingredients necessary for the production step in the mixing vessel, are introduced into the closed mixing vessel and react without opening the mixing vessel, and the mixing takes place without opening the mixing vessel, and the product is removed from the mixing vessel without opening the mixing vessel.

20 Claims, No Drawings

(56) References Cited

U.S. PATENT DOCUMENTS

| | | | | |
|---|---|---|---|---|
| 5,264,515 A * | 11/1993 | Cody et al. | ............ | C08G 18/10 522/172 |
| 6,265,517 B1 * | 7/2001 | Stuart | .................... | C08G 18/10 528/26 |
| 2013/0225745 A1 * | 8/2013 | Fujimoto et al. | ........ | C09J 11/04 524/425 |
| 2015/0031806 A1 * | 1/2015 | Lim et al. | ............ | C08G 18/246 524/114 |
| 2018/0134932 A1 * | 5/2018 | House et al. | .......... | C08G 18/12 |

FOREIGN PATENT DOCUMENTS

| | | |
|---|---|---|
| EP | 0 814 120 A1 | 12/1997 |
| EP | 2 055 372 A1 | 5/2009 |
| WO | 01/49774 A2 | 7/2001 |

OTHER PUBLICATIONS

"Nanoprodukte—Identifikation und Exposition," NanoProdex, Sep. 30, 2013, <https://www.bionanonet.at/images/stories/anhang i zum endberichtwerkvertrag abschlussberichtnanoprodex seitenl-100.pdf> [retrieved Aug. 22, 2017], 100 pages.

Verachtert, E., et al., Beste Beschikbare Technieken (BBT) voor Verf-, Lak-, Vernis-, Drukinkt- en Lijmproductie, Vito (Vision on Technology), Apr. 2014, <https://emis.vito.be/sites/emis.vito.be/files/articles/1142/2014/BBTVerf FinaleDraft MET WATERMERK.pdf> [retrieved Dec. 2, 2016], 24 pages.

\* cited by examiner

METHOD FOR PRODUCING MOISTURE-SENSITIVE PRODUCTS

FIELD OF THE INVENTION

The present invention relates to the production of moisture sensitive products. More particularly, the invention relates to the production of products which are applied locally with some precision, for example, by pressing them out of a cartridge or sausage-like container through a nozzle, and in this way may be used as a sealant, as an adhesive, as a filling material or as an insulating material, with the common characteristic that all these substances, after application in one way or another, further react with water or moisture, usually from the air or from the immediate proximity of where the substances were applied, to form their final cross-linked 3-dimensional structure, also referred to as hardening or "curing", in order to obtain the final properties for which they are employed.

BACKGROUND OF THE INVENTION

An important example of products that ultimately cure by reaction with water or moisture, may be found in the family of caulks, mastics and sealants.

Sealants or mastics—the two terms are used herein as synonyms of each other—are offered having a wide range of properties, ranging from "elastic", over "pseudo plastic", up to "plastic", depending on their response to deformation in their final state, what is also referred to as their "elastic shape recovery" or by the equivalent term "durably permissible deformation", by which is meant the capability of a sealant to return, after stretching, to close to its original shape, or to the deformed shape which afterwards remains in the long term. The capability for "durably permissible deformation", which in practice is the maximal movement a joint may have, ranges thereby typically up to at most 7-8% for plastic products, which often have no shape recovery anymore after repeated deformation, to approximately 10-15% durably permissible reformation for pseudo-plastic or plasto-elastic products, to at least 20% for the truly purely elastic products. With plastic and pseudo plastic sealants, the curing quite often substantially occurs by physical drying, i.e. by the evaporation of some solvent, including water, from the composition.

The family of elastic sealants and mastics on the other hand is primarily populated by products which are cured by chemical reaction with water or moisture. The terms water and moisture are in this document used interchangeably, and as synonyms of each other. The invention indeed relates to the reaction with water ($H_2O$), and the invention does not make any distinction with regard to the physical state or the purity of the water that would be available for that reaction.

These elastic sealants are usually made based on silicone or based on polyurethanes (PUR), but also hybrid sealants, on the basis of "silane-modified polymers" (SMP) with, for example, a polyurethane or a polyether backbone or main chain, are commonly known. Their capability for "elastic shape recovery" may reach above 70% and often even more than 90%, a feature for which they are highly appreciated, both by professionals and do-it-yourselvers, in the building and construction industry, such as in window mounting, in sanitary applications, for elastic bonding in the glass and metal industry, for sealing in cars, boats, caravans, for the application of connecting joints and expansion joints, and the like.

The silicone sealants thereby represent in the market by far the biggest part of these elastic sealants. The production of elastic silicone sealants is based on a reactive polysiloxane polymer, having on each silicon atom in the chain usually each time two organic radicals which extend sideways from the backbone of the silicon oxide polymer, usually a polydimethyl siloxane. The polymer is reactive because there is at both ends of the typically straight $[R_2Si-O]_n$ chain a group which is still reactive, typically a hydroxyl function. In the most traditional production of silicone sealants, the first chemical step is the reaction of the reactive end groups of the polysiloxane polymer with a particular cross-linking agent or cross-linker to form the so-called "prepolymer", which is then still capable of curing by cross-linking. This reaction step is sometimes referred to as "end-capping", i.e. the addition of a different end group on the reactive polymer, and the product obtained may thus also be called an "end-capped polymer". Because this step leads to the formation of a "prepolymer", i.e. a compound suitable for further polymerisation, this reaction step is often also referred to as "pre-polymerisation". This step prepares the reactive polymer for the subsequent polymerization reaction without itself being a polymerization reaction. The term pre-polymerization is thus not incorrect, but it should be interpreted and read with that meaning.

Most conventionally an alkyl triacetoxy silane is used as the cross-linking agent, e.g. ethyl triacetoxy silane, of which one of the three acetate functions reacts with the hydroxyl group of the polymer, whereby, under the release of one molecule of acetic acid, an additional Si—O—Si (siloxane) bond is formed. In this way, the polysiloxane polymer obtains on both sides of the siloxane chain each time two acetoxy functions, i.e. on each side two reactive end groups. These remaining reactive groups are intended for the reaction with moisture from the environment, after the application of the silicone paste, to form a new siloxane bond between two polymer chains, again under the release of a molecule of acetic acid. Because the cross-linking agent has brought to each end of the original dialkyl siloxane polymer two reactive end-groups, in this way a three dimensional, cross-linked final structure may be formed by the reaction with water or moisture from the environment. Besides this technique based on alkyl triacetoxy silane, also alkoxy and oxime technologies are known. Furthermore are found benzamide, lactate, and/or enoxy technologies, albeit to a much lesser extent.

During the production of the silicone sealant, usually additional additives such as plasticizers, extenders, fillers, pigments and/or dyes, and adhesion promoters may be incorporated, for a number of reasons. To accelerate the cross-linking in the final application, usually also a catalyst is added.

To ultimately obtain from the production a paste, which is suitable for readily being applied as the final product, at least one thickening agent is added, most typically silica ($SiO_2$), in order to change the rheology, whereby the still substantially liquid reaction product stiffens to become a paste, which is substantially a visco-elastic substance. The final paste must then be filled into a suitable container, often a plastic cartridge from which the silicone sealant may be extruded, using some pressure, through a nozzle onto its final destination.

For allowing a proper cross-linking after the application of the sealant, it is important that the two reactive end groups on the siloxane polymer are still available after the application of the silicone sealant from its container to its final destination. They may not have had the opportunity for reacting away, such as during the production, transport or storage of the silicone sealant, i.e. before the sealant is employed in its final application.

It is therefore rather important that moisture or water, in whatever form, is prevented from reacting prematurely with the reactive groups of the moisture-sensitive products, in the case of silicone sealants the reactive end groups on the siloxane polymer, such as those which have been provided by the reaction with the cross-linking agent. Such premature reaction of the reactive groups with moisture or water leads to a premature cross-linking of the prepolymer chains in the mixture, which may lead to a variety of problems. For example, during the production this may lead to the formation of flakes in the final product, i.e. chunks of cross-linked polymer which are no longer reactive, which are disturbing in the application and which may significantly upset the final appearance of the applied paste.

But also during the production, a premature cross-linking may lead to an increased adhesion of the product to the production equipment, which may significantly increase the cleaning costs and the maintenance frequency, and reduce the production capacity of an installation. Also downstream of the production, i.e. during storage and/or transport of the packaged mastic up to the end user, premature cross-linking may occur, by entry of more moisture or water, such that the product becomes unusable. Even after the purchase, i.e. with the end user, this phenomenon may still occur with the risk that the purchased package would not reach the desired and/or prescribed shelf-life.

The inventors have found that it is very difficult to produce cartridges for which a shelf-life of more than 6 months can be guaranteed. The inventors have found that this problem occurs because moisture may find via several pathways a way into the known methods for the production of moisture sensitive products.

WO 01/49774 A2 describes the production of moisture curable organosiloxane compositions, by mixing polydiorgano siloxanes, which still have reactive end groups, with silane cross-linkers, which react with those end groups. The products were intended as sealant mass. In WO 01/49774 A2 a first set of ingredients was mixed in a small batch mixer (Whip Mix® Corporation) which is equipped with a vacuum connection. After 1 minute of mixing, filler was added and dispersed for about 1 minute. Subsequently a scraping was performed and again 1 minute of mixing. The final composition was only deaerated at the end of the method, at 50 mm Hg vacuum during 1 minute, before being packaged in Semco® polyethylene cartridges. After packaging the cartridges were centrifuged to remove all trapped air from the packaging. The products were tested after 1 night of aging in their packaging under ambient conditions. In WO 01/49774 A2 the batch mixer is opened repeatedly during the process, and the product is deaerated only at the end of the method, just before being packaged into cartridges. After the packaging, air (hence also moisture) appears to have remained in the cartridges. A drawback of this method is that each breaking of the vacuum may lead to a premature curing of the polymer chains in the mixture. The shelf-life of the compositions is not determined in WO 01/49774 A2.

EP 0 814 129 A1 also describes the production of similar products. In the examples, the products are mixed and reacted at ambient pressure, without additional heating or cooling, and at a relative humidity of approximately 50%. The products are evaluated after 2, 4, 8 and 12 weeks of storage, so no longer than 3 months.

BE 882 657 A1 also describes the production of similar products. In the examples the reactive polymer and the filler are carefully mixed. After venting of the homogeneous mixture, the cross-linker is added, and one mixes everything in a closed system inaccessible for moisture. In BE 882 657 A1, the usability of the product after 6 months storage is assessed, especially whether a separate oily phase has formed.

In EP 0 802 222 A1, the reactive polymer is added together with fumed silica as the thickener, the cross-linker, the adhesion promoter, the catalyst and sometimes an amount of ethyl acetoacetate, into a 'change can' mixer, and one mixes them under reduced pressure, with the intention to remove volatile components, mainly the methanol or ethanol by-products. According to EP 0 802 222 A1 mixing is usually performed under circumstances which keep atmospheric moisture outside. EP 0 802 222 A1, however, discloses no details on bringing together the ingredients, including acetylacetoacetaat and fumed silica, substances which do not easily stay in place. EP 0 802 222 A1 also discloses nothing about how the product must be taken from the 'change can' mixer into the Semkit® cartridges.

The inventors have found that the methods which are disclosed in the state of the art leave things to be desired concerning the shelf life of the cartridges in which the products end up being packaged.

The present invention is concerned with reducing the risk of premature crosslinking of the moisture sensitive products during their production, transportation and/or storage until its final application, mainly for the purpose of extending the shelf life of the packaged end product and/or for improving the stability of the packaged final product.

The present invention aims to obviate or at least mitigate the above described problem and/or to provide improvements generally.

SUMMARY OF THE INVENTION

According to the invention, there is provided a method as defined in any of the accompanying claims.

In an embodiment, the present invention provides a method for the production of a moisture curable composition whereby the reactive end groups of a reactive polymer are reacted with a cross-linking agent for forming a prepolymer, whereby the method is operated in batch mode and the production of the prepolymer occurs in a mixing vessel, characterized in that the reactive polymer and the cross-linking agent, as well as the additional ingredients necessary for the production step in the mixing vessel, are introduced into the closed mixing vessel and react without opening the mixing vessel, and the mixing takes place without opening the mixing vessel, and the product is removed from the mixing vessel without opening the mixing vessel.

The provision that the raw materials for the production of the product may be fed into the mixing vessel, as well as the product may be removed from the mixing vessel, without opening the mixing vessel, brings the advantage that the risk of coming into contact with ambient air, and with the moisture therein, is reduced for the moisture-sensitive ingredients, for the reacting mixture, as well as for the moisture-sensitive product which is formed by the reaction of the reactive polymer and the cross-linker. This advantage is obtained without losing the advantage of flexibility offered by a batch production process compared to a continuous production process. Continuous production processes are suitable for the production of large quantities of a relatively small number of products. With batch production processes, one is in each case able to adjust or change the formulation and the ingredients, such that each time a different product may be obtained. The advantage of this invention is therefore to be seen in comparison with a batch production method wherein the mixing vessel is to be opened for either adding one of the ingredients to the mixing vessel content or for removing the finished product from the mixing vessel.

The advantage obtained with the present invention is particularly important with respect to the amount of reactive mixing vessel product that remains in the mixing vessel after removing the reactive mixing vessel product from the mixing vessel. Thanks to the present invention, that amount of residual reactive mixing vessel product is not given an opportunity to react with moisture in ambient air, because the mixing vessel remains closed between the different production batches. The remaining reactive mixing vessel product is mixed with the ingredients of the next batch, but due to the absence of any significant moisture ingress between two production batches, this reactive mixing vessel product did not have a chance to already start curing, which would otherwise often lead to the formation of flakes. Thanks to the present invention, the risk for forming flakes is thus considerably reduced compared to the production batch with a mixing vessel which has to be opened each time for the addition of particular ingredients and/or for removing the product from the mixing vessel.

This invention brings the important advantage that no or very little product remains that is less usable or unusable, and which should be considered as waste.

The main problem solved by the present invention is reducing the risk that moisture finds its way inside into the method according to the present invention. The precautions prescribed by the present invention are intended to exclude a disturbing element from the method. The problem solved does not concern containing a volatile ingredient from escaping, such as in the production of solvent-based products like paints, lacquers, varnishes, inks or many adhesives. In order to contain the most volatile ingredient used in the present method, i.e. the crosslinker, it would be sufficient to keep the mixing vessel closed starting from the addition of the cross-linker until this cross-linker has been able to react with the reactive polymer. The prescriptions of the present invention go however much further, in that they require that the mixing vessel remains closed starting from the addition of the ingredients until the removal of the product from the vessel.

An additional advantage is that the production also requires less human intervention, such as for removing the opened mixing vessel containing the finished product from underneath the lid with its stirrer and/or scraper, such as in the typical batch process. This invention allows one operator to control a plurality of mixers, while for a proper and smooth course of a typical batch process a plurality of operators are necessary for one single mixer.

A further additional advantage of this invention is that the process may be highly automated, greatly reducing the risk for human error, and thus increases the reliability of production, primarily in terms of scheduling and product quality.

Another additional advantage is that there is less opportunity for the development of smells in the production environment, which improves the industrial hygiene of the production. This is for example relevant for acetoxy systems, whereby acetic acid is released as a by-product by the reaction of the cross-linker with the reactive polymer, i.e. after the addition of the cross-linker to the mixing vessel. The smell of acetic acid is usually experienced as unpleasant, and the risk for releasing acetic acid fumes is substantially reduced by the current invention.

DETAILED DESCRIPTION

The present invention will hereinafter be described in particular embodiments, and with possible reference to particular drawings, but the invention is not limited thereto, but only by the claims. Any drawings described are only schematic and are non-limiting. In the drawings, the size of some of the elements may be exaggerated and not drawn to scale for illustrative purposes. The dimensions and the relative dimensions in the drawings do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than those described and/or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein may operate in other orientations than described or illustrated herein.

The term "comprising", as used in the claims, should not be considered as being limited to the elements that are listed in context with it. It does not exclude that there are other elements or steps. It should be considered as the presence provided of these features, integers, steps or components as required, but does not preclude the presence or addition of one or more other features, integers, steps or components, or groups thereof. Thus, the volume of "an article comprising means A and B" may not be limited to an object which is composed solely of agents A and B. It means that A and B are the only elements of interest to the subject matter in connection with the present invention. In accordance with this, the terms "comprise" or "embed" enclose also the more restrictive terms "consisting essentially of" and "consist of". By replacing "comprise" or "include" with "consist of" these terms therefore represent the basis of preferred but narrowed embodiments, which are also provided as part of the content of this document with regard to the present invention.

The products produced by the method according to the present invention are generally characterized in that they form a pasty substance which, after application, usually locally and with some precision by extruding them through an outlet mouth, remains in place. For example, the products being considered as mastics or sealants, may after application as an as-yet uncured paste, usually still during some time be rubbed and/or smoothened, and thereby after curing achieve a proper sealing. The product paste before the curing is therefore usually characterized by a very high so-called "complex viscosity" under low shear force. The "complex viscosity" is determined by oscillation, whereby the viscous and the elastic contribution to the rheological response may be separated from each other. Under low shear forces, the paste preferably behaves substantially as a solid. It is desirable however that the extrusion of the paste through the outlet mouth does not require excessively high forces. It is therefore desirable that the paste, before the curing, exhibits a lower complex viscosity under high shear forces. The paste product thus preferably exhibits a high shear thinning effect. Under high shear the paste should therefore preferably behave more like a liquid.

But also the properties after curing are important and may vary considerably. From some mastics or sealants it is expected that they remain plastic after curing but therefore have also little capability for recovery after deformation. The durably permissible deformation of a "plastic" sealant is usually not higher than 7.5%, meaning that the product may only sustain a deformation of at most 7.5% in order for it to return to its original situation after removal of the deforming force. Beyond such deformation there will remain a permanent deformation. Other sealants are expected to eventually exhibit a plasto-elastic behaviour. These sealants have a durably permissible deformation higher than that of plastic sealants, typically of about 12.5%. The majority of the mastics and sealants is however more "elastic", and may (almost) fully recover upon deformations of 20% or more. Most of the silicone sealants have an elastic recovery of more than 80%, and often even more than 90%. But also within the elastic sealants there is demand for products having a wide variety of properties.

Each product in the family of products produced by the method according to the present invention therefore represents a tight balance between the properties of the uncured paste, and those of the ultimately cured product after application. Each time, the combination of properties is a result of a careful selection of ingredients and of the quantities incorporated thereof. Each ingredient is important, such as the selection of the reactive polymer and the nature of the cross-linking agent, but also the whether or not employment of the other possible ingredients, such as plasticizers, extenders, fillers, thickening agents, additional adhesion promoters, and catalysts.

Within the context of the present invention, with reactive polymers is meant a reactive polymer of silicon oxide, having a backbone formed by alternating silicon and oxygen atoms. Sideways on this linear backbone, on each silicon atom of the silicon oxide polymer, are organic side groups, usually saturated organic groups, and preferably methyl groups such that the reactive polymer is a polydimethylsiloxane. This reactive polymer is a result of a polymerization reaction. Every polymer molecule is characterized by a particular chain length, and a mixture of molecules is generally characterized by a distribution of the chain length over the various molecules. Typically the average chain length of the molecules in a mixture is readily sufficient for distinguishing different reactive polymer raw materials. An average molecular weight (g/mol) may in addition be reported as a characteristic for a polymer composition, whereby one, however, has to keep in mind that a wide spread of the molecular weight typically exists over the different polymer molecules in the composition.

With the same organic side groups, as the average chain length of a reactive polymer or polymer mixture increases, the dynamic viscosity of the polymer or polymer mixture will also increase. The viscosity is expressed in Pascal second (Pa·s). It is therefore common practice to characterize the reactive polymer products partially by their viscosity. Commonly used reactive polydimethylsiloxanes have a viscosity at 20° C. in the range of 20-350 Pa·s, e.g. those which are referred to as type 20 (20 Pa·s), 50 (50 Pa·s), 80 (80 Pa·s), 120 (120 Pa·s), 150 (150 Pa·s) and 350 (350 Pa·s). Suitable reactive polymers are available under the name Polymer FD from the company Wacker, Xiameter OHX from Dow Corning or Xiameter, Silopren E from Momentive Performance Materials, or Bluesil FLD from Bluestar.

The inventors have found that the reactive polymers having a higher viscosity, and therefore a higher chain length, form softer end products in comparison with the reactive polymers having a lower viscosity.

The polymer molecule stays reactive thanks to the end group, typically at both ends of the backbone, usually being a hydroxyl group or function. It is with this end group that the cross-linking agent reacts. The cross-linking agent serves the purpose of providing, after the reaction with the end group on the reactive polymer, more than one reactive and available end group.

In the context of the present invention, the reaction product of the reactive polymer with the cross-linking agent is referred to as an end-capped polymer. The reaction of the cross-linking agent with the reactive polymer, whereby each time a cross-linker molecule attaches itself to one of the reactive end groups of the reactive polymer, is called the pre-polymerization. The ultimate curing under the influence of water or moisture is then the polymerization.

It is the availability of the at least two reactive end groups at each end of the end-capped polymer, whereby the reactive end groups may react with each other under the influence of water, or (air) humidity, which enables the ultimate formation of a three-dimensional structure, called the curing or polymerization.

Plasticizers may be added to affect the rheological behaviour of the uncured paste, but also to help setting the elasticity and the elastic shape recovery of the cured final product. A proper selection and dosing of the plasticizer may also reduce the amount of thickener required for obtaining a desired paste thickness. Suitable plasticizers are for example the so-called silicone oils, being non-reactive silicones, such as polydimethylsiloxane, and which are offered in different qualities having for example different chain lengths. The siloxanes are particularly suitable because they offer a high compatibility with the other ingredients of the final product, in particular with the prepolymer. Quite common non-reactive polydimethylsiloxanes have a viscosity at 20° C. in the range of 100 mPa·s to 12,500 mPa·s. Such products are a.o. offered as Plasticizer W by the company Momentive Performance Materials, or as Weichmacher by the company Wacker.

Often, at least a portion of the plasticiser may be replaced by a solvent having a high boiling point. Suitable are e.g. hydrocarbons or mixtures thereof having a high boiling range and thus a very low volatility. Such products are, for example, offered as Exxsol® D60, D80, D100, D120, or D140, or as Isopar® H, J, K, L, M, N, or V from the company ExxonMobil Chemical, or Ketrul® D100, Hydroseal® G232H, G240H, G3H, G250H, G270H, G400H, G310H, G315H, G340H from the company Total, or Shellsol® D60, D80, D100 from the company Shell, Pilot 261, 291, 321, 400, 600, 900 from the company Petrochem Carless, or Nyflex 8120, 8131, 800 from the company Nynas.

The choice of the cross-linking agent has an important impact on the properties of the final product.

The inventors prefer as cross-linking agent a compound which is composed of a silicon atom carrying three reactive groups and one non-reactive group. Two of the three reactive groups are intended for reacting upon curing, and provide the capability to build the targeted three-dimensional network, as described elsewhere in this document. The selection of the remaining non-reactive group allows to further contribute to the properties of the final product.

In silicone sealants the inventors use a.o. alkyl triacetoxy silane as the cross-linking agent. These so-called "acetic acid containing" cross-linking agents result in rather "tough-elastic" products, also characterized by some acidity. They are suitable for the majority of end uses without problems, particularly in glazing, sanitary applications, elastic bonding in the glass and metal industry, or for seals in automobiles, boats or caravans. They are less suitable with alkaline substrates such as concrete or cemented substrates, or for particular metals such as copper. The inventors prefer ethyl triacetoxy silane. The methyl, propyl and vinyl equivalent variants are however also known and suitable. The ethyl variant offers the advantage that it is liquid under standard conditions, so it may readily be processed and incorporated into the composition. Also mixtures of the methyl and ethyl variant are widely used, because most versions thereof are liquid. Often used as "acetic acid containing" cross-linkers are methyl triacetoxy silane, ethyl triacetoxy silane, propyl triacetoxy silane, and mixtures thereof. Suitable products are, for example Cross-linker ES21, ES23, ES24 available from the company Wacker, Cross-linker 3034, 3187 from the company Momentive Performance Materials, Cross-linker MTA, ETA, PTA, ETA/MTA (70/30), PTA/MTA (70/30) from the company Nitro Chemistry, Cross-linker AC 10, 15, 30 from the company Evonik Hanse.

For the sealing of polyvinyl chloride (PVC) plastic materials, alkaline substrates, and porous substrates, the inventors prefer silicone sealants having a rather neutral composition with respect to acids and acid generation, and thus based on other crosslinking agents than triacetoxy silanes. The inventors produce neutral silicone sealants preferably using one or more silanes based on alkoxy, such as alkyl trialkoxy silane, preferably methyl trimethoxy silane or vinyl trimethoxy silane, or with one or more oximes as substituent on the silicon of the cross-linking agent, although benzamide or lactate are also suitable. Amongst the oxime-based crosslinking agents, methyl ethyl ketoxime (methyl ethyl ketone oxime in full, often abbreviated as "MEKO", CH3-CH2-(CH3)C=N-OH) is a well-known substituent. Other well-known substituents for the silicon of a silane cross-linking agent are acetone oxime, MIBKO or methyl isobutyl ketone oxime, and MPKO or methyl propyl ketone oxime.

Suitable oxime-based cross-linkers are methyl tris (MEKO) silane, vinyl tris(MEKO) silane, tetrakis (MEKO) silane, methyl tris(MIBKO) silane, vinyl tris(MIBKO) silane, methyl triacetone oxime silane, ethyl triacetone oxime silane, vinyl triacetone oxime silane, methyl tris (MPKO) silane, vinyl tris(MPKO) silane, and mixtures thereof. Suitable products are e.g. Cross-linker MOS, VOC, TOS, MT10, MT15, VT5, VT2, VT1, LM43, LM100, LM200, LM400, OS1600, OS2600 of the company Nitrochemie, Cross-linker OX10, OX20, OX30, OX32, OX33 from the company Evonik Hanse.

Suitable alkyl, alkenyl or phenyl trialkoxy cross-linkers are, for example, methyl trimethoxy silane, ethyl trimethoxy silane, propyl trimethoxy silane, vinyl trimethoxy silane, isobutyl trimethoxy silane, phenyl trimethoxy silane, methyl triethoxy silane, propyl triethoxy silane, isobutyl triethoxy silane, vinyl triethoxy silane, phenyl triethoxy silane, octyl trimethoxy silane, octyl triethoxy silane, and mixtures thereof. Suitable products are e.g. Silquest A-1630, Silquest A-171 available from the company Momentive Performance Materials, Geniosil® XL-10, Cross-linker ME60, ME63, Geniosil GF56 from the company Wacker, Cross-linker MTMS (Dynasylan®) VTMO (Evonik), vinyl trimethoxy silane, vinyl triethoxy silane from the company Nitrochemie.

In the mastic an adhesion promoter may also be incorporated. Suitable adhesion promoters are, for example, organosilanes, preferably aminosilanes or epoxysilanes. Suitable adhesion promoters may e.g. be found in the families of products that are offered as Geniosil® from the company Wacker, as Silquest from Momentive Performance Materials, and as Dynasylan® from Evonik.

Quite suitable as adhesion promoters are e.g. di-tert-butoxy diacetoxy silane for the "acetic acid containing" products, but suitable for neutral products are also 3-aminopropyl triethoxy silane, 3-aminopropyl trimethoxy silane, N-(2-aminoethyl)-3-aminopropyl trimethoxy silane, 3-(2-amino-iethylamino)propyl triacetoxy silane, N-(3-trimethoxy¬isilylpropyl) diethylene¬triamine, bis-(3-methoxysilylpropyl)-amine, amino¬ethylamino-ipropyl methyl dimethoxy silane, N-(2-aminoethyl)-3-aminopropyl dimethoxy methyl silane, N-(n-butyl)-3-aminopropyl trimethoxy silane, N-(n-butyl)-3-aminopropyl trimethoxy silane, 3-aminopropyl methyl diethoxy silane, amino ethyl amino trimethoxy silane, 3-glycidoxypropyl trimethoxy silane, 3-glycidoxypropyl triethoxy silane, gamma-ureidopropyl trimethoxy-isilane, 3-aminopropyl (methyl)silsesqui-ioxanes ethoxy terminated, polydimethyl siloxanes with aminoalkyl groups, polydimethylsiloxane reaction products with N-(3-trimethoxysilyl) propyl cyclohexane amine, alkoxy polysiloxanes modified with aminoalkyl groups, multifunctional amino silanes, and functional oligosiloxanes.

Several compounds may serve as thickening agent. The inventors prefer silica as the thickener, also called silicic acid, because of the reinforcing effect silica may have on the product properties. Silicic acid is a weak acid derived from silicon dioxide, $SiO_2$, having as general formula $SiO_2.nH_2O$, whereby n may differ.

Silicic acid is preferred because it engages into chemical bonds with the backbone of the polymer, bringing a significant enhancement of the physical and mechanical properties of the final product. The inventors have found that various forms of silica may be used as thickener, but the inventors prefer to use fumed silica or "pyrogenic silica" because the desired effects are even more pronounced. It is especially the tear strength of the final product which is increasing. This interaction between the thickening agent and the polymer is much weaker or non-existent with several possible alternatives, and it is therefore also the main reason for the inventors to select silicic acid.

A thickening agent is in many formulations needed for ultimately forming a paste, suitable for being extruded through a nozzle for the application into the desired location. With silicone sealants, the inventors preferably use silicon acid or silica as thickening agent. Suitable thickening agents are e.g. available as HDK® V15, V15A, N20, H13L, H15, H18 from the company Wacker, as Cabosil® L-90, LM-150, M-5, TS-610, TS-622 from the company Cabott, as Aerosil® 130, 150, 200, R972, R974 from Evonik.

Unless one desires a transparent final product, the formulation of the moisture-curing end product may also contain one or more fillers. Suitable fillers are e.g. chalk or dolomite, in finely divided form. These fillers may be obtained by grinding or by precipitation. The filler may also be coated with a suitable coating. Fillers with a coating typically comprise less moisture at the end of their production, and also appear to have a lower tendency for absorbing moisture after their production, such as during storage, handling or transport. Coated fillers may bring a reinforcing effect on the final product, and thus positively affect the mechanical properties of the final product. Suitable fillers are e.g. found in the product family of natural calcium carbonates, precipitated calcium carbonates, calcium-magnesium-carbonates (also known as "dolomite"), which are offered by a wide series of providers, such as Omya, Imerys and Alpha Calcite.

To speed up the final curing, often also a catalyst is added. The catalyst makes the product much more sensitive to moisture. A catalyst is therefore preferably added quite late in the manufacturing process, if possible even as the last ingredient in the formulation, possibly still followed by pigment and/or fungicide. The traditional catalysts were usually based on tin (Sn). More modern catalysts are based on titanium (Ti), preferably in the form of titanates, or bismuth (Bi), and are mainly preferred for ecological reasons. Suitable catalysts may e.g. be found in the following product families: dibutyl tin diacetate, dioctyl tin diacetate, dibutyl tin dilaurate, dioctyl tin dilaurate, dibutyl tin dicarboxylate, dioctyl tin dicarboxylate, dibutyl tin dineodecanoate, dioctyl tin dineodecanoate, dibutyl tin oxide mixtures, dioctyl tin oxide mixtures, tetraisopropyl orthotitanate, titanium acetyl acetonate and other titanium and/or bismuth-based catalysts. There are also suitable catalysts available based on calcium (Ca) and/or zinc (Zn)

Suitable products are e.g. the catalysts which are available under the brand name TIB KAT®, such as types 216, 217, 218, 219, 221, 223, 226, 229, 232, 233, 248, and 318, from the company TIB Chemicals AG.

In an embodiment of the present invention the mixing vessel is closed with a lid and the lid of the mixing vessel is provided with an in height adjustable stirring system such that, without having to open the mixing vessel by lifting the cover, the height of the stirrer may be adjusted relative to the liquid level in the mixing vessel.

The inventors have found that the liquid level of the product in the mixing vessel may change considerably over the entire course of the batch production. For example, the addition of the required amount of the ingredient which is necessary to turn the liquid reaction product into a paste causes a substantial increase in volume, and thus a substantial increase of the liquid level in the mixing vessel. This feature of the present invention brings the advantage that the height of the stirrer may be adjusted each time, in function of what is desirable in each step throughout the course of production, such as with respect to stirring effects, splashing or the prevention thereof, as well as relating to the energy input, which typically also determines the temperature increase caused by the shear forces during the stirring.

In an embodiment of the present invention, the mixing vessel is kept under a vacuum pressure during the addition of the reactive polymer and of the cross-linking agent, preferably also during the addition of the plasticizer and/or the extender, if applicable.

Keeping the mixing vessel under vacuum pressure during the addition of the ingredients brings the advantage that any remaining final product from the previous batch is given as little as possible time and opportunity to react with any moisture which may enter together with these ingredients during the introduction of these ingredients. This feature of the present invention thus reduces the risk for the formation of unwanted flakes of already entirely or partially cured reaction product in the mixing vessel, e.g. during the preparation of the reaction or during the formation of the prepolymer.

In an embodiment of the present invention, a thickener is added to the mixing vessel and the mixing vessel is kept at about atmospheric pressure during the addition of the thickening agent, and, if a vacuum pressure is present in the mixing vessel, this vacuum pressure is broken prior to the addition of the thickening agent.

The inventors prefer to use silica or silicic acid ($SiO_2$) as the thickening agent, because of its exceptional enforcement effect. Various forms of silica may be used as thickening agent, such as "precipitated silica", but the inventors preferably use so-called fumed silica, because therewith the reinforcing effect of the thickening agent is even more pronounced. The silicic acid is preferably supplied in a solid form, as a powder or as "snowflakes". This solid form of silicic acid is however characterized by a very low bulk density. The ingredient is very light and quite prone for being entrained by a moving stream of gas or air. The inventors have found that the silicic acid might thus readily find its way into the exhaust system assuring the vacuum pressure in the mixing vessel, if the extraction would be kept in operation while silicic acid is added into the mixing vessel. The inventors therefore prefer to close the connection of the exhaust system with the mixing vessel before the addition of the silicic acid is started, and also to open this connection again only after the addition of the desired amount of silicic acid to the mixing vessel. During the addition of the silicic acid, the applicants preferably maintain a slight overpressure in the mixing vessel. This overpressure is preferably applied via the supply line through which the silicic acid is added. This overpressure is preferably subsequently released via the weighing installation which assures the correct dosing of silicic acid, such that the excess gas, preferably dry air, may be released via the filter which is provided as part of this weighing installation.

In an embodiment of the present invention a thickener is added to the mixing vessel, preferably silicic acid, and the thickener is brought into the mixing vessel in a pneumatic manner. The inventors have found that pneumatic transport is a quite convenient way for transporting the light but solid thickener in a gas stream, and that at the same time, the added gas may be used for breaking the vacuum pressure, which is preferably maintained during the reaction, at the moment the thickener is added. Preferably the inventors use a stream of air for the pneumatic transport, and more preferably a stream of dried air. More preferably this dried air has a dew point of at most −40° C., preferably at most −45° C., most preferably a dew point of at most −50° C.

The use of air brings the benefit of reduced risk and increased safety for the operating personnel, because air upon release to the atmosphere is non-flammable, as opposed to when a combustible gas would be used such as natural gas, and because air, when being released to the atmosphere, causes no dilution of the oxygen level in the atmosphere in the proximity of the point of release, and, upon remaining in a container, does not represent an environment in which an unsuspecting operator could suddenly face an oxygen deficiency, which may e.g. be the case with nitrogen.

In an embodiment of the present invention the mixing vessel is kept under a vacuum pressure while pumping the product out the mixing vessel.

The inventors prefer to maintain the vacuum pressure in the mixing vessel while pumping out the mixing vessel, in order to also reduce the risk of contact with moisture during that part of the production process.

In an embodiment of the present invention, the arms of the stirrer in the mixing vessel are provided with scrapers extending up to a distance of at most 5 mm away from the sidewalls of the mixing vessel, preferably of at most 4 mm, more preferably of at most 3 mm, even more preferably of at most 2 mm.

The inventors have found that this design of the stirring system, in collaboration with the adjustability in height of the stirring system, offers the possibility to substantially scrape clean the inner side of the side walls of the mixing vessel while the mixing vessel is being emptied, so there is left little or no residual product against the side walls of the mixing vessel when the mixing vessel has been emptied.

In an embodiment of the present invention the lower surface of the stirrer has substantially the same shape as the bottom of the mixing vessel, preferably with a clearance of at most 5 mm, more preferably of at most 4 mm, still more preferably of at most 3 mm and most preferably of at most 2 mm. Preferably the bottom of the mixing vessel is flat, and the lower surface of the stirrer ends up in that same plane.

This brings the advantage that the bottom of the mixing vessel is also scraped off well, and hence less residual product remains after emptying a completed mixing vessel.

In the embodiment of the present invention in which the lower surface of the stirrer has substantially the same shape as the bottom of the mixing vessel, the lower surface of the stirrer is over substantially the entire width additionally provided with a rubber strip.

This brings the advantage that the bottom of the mixing vessel is scraped off even better, and therefore even less residual product may remain after pumping out a completed mixing vessel.

These provisions of scrapers on the stirrer, of close cooperation between stirrer and mixing vessel bottom, and of the additional rubber strip, bring each individually and even more in cooperation the advantage of little cross-contamination between the products of subsequent production batches. An additional advantage is, when the mixing vessel needs anyway to be opened and cleaned, that less waste ends up from the cleaning, thus reducing the waste production of the overall production process. The inventors have found that a batch process using a mixing vessel which is at least partially filled before the lid is closed, which mixing vessel full of finished product also has to be opened for bringing and connecting it to the filling installation, is usually characterized by about 2% production waste. The inventors have found that the production waste may be reduced down to less than 0.5% of the total production volume.

In an embodiment of the present invention is provided on every one of both arms of the stirrer at least one upwards pointing paddle ending in a point forming an angle of at most 45 degrees, which corresponds to at most one eighth of a full circle. Preferably both arms are each equipped with at least two such paddles, more preferably at least four, even more preferably at least six, preferably at least eight, more preferably at least 12, even more preferably at least 14 upwards pointing paddles.

Preferably these paddles have a point angle of at most 30 degrees.

The inventors have found that the upwards pointing paddles on the arms of the stirrer contribute significantly to a good and fast dispersion of powders in the liquid contents of the mixing vessel. This is especially advantageous when dispersing the thickener. The paddles assure a quick disappearance of so-called grains which readily form when the thickener is added into the mixing vessel.

In the embodiment of the present invention with the upwards pointing paddles on the arms of the stirrer, these paddles are preferably provided on the outer 60% of the length of the stirrer arm, preferably on the outer 50% more preferably on the outer 40%, and even more preferably on the outer 30% of the length of the stirrer arm. This brings the advantage that for the same rotating speed, the tip speed of the upwards pointing paddles is higher, which has a beneficial effect on the rate at which a powder such as the thickener may be dispersed into the contents of the mixing vessel.

In an embodiment of the present invention is provided on each of the arms of the stirrer in the mixing vessel at least one upwards pointing paddle, forming an angle with the longitudinal axis of the stirrer arm which is less than 90 degrees or a quarter circle. Preferably the angle between the paddle and the longitudinal axis of the stirrer is at most 60°, more preferably at most 45°, even more preferably at most 30°.

The inventors have found that the paddles on the stirrer arms assure a central vortex during stirring, by which a powder is incorporated much faster into the content of the mixing vessel. The inventors have found that this effect is stronger when the paddle makes a smaller angle with the longitudinal axis of the stirrer.

Preferably, these paddles are provided on the inner 50% of the length of the stirrer arm, preferably on the inner 40% of the length of the stirrer arm. The inventors however prefer to bring these paddles not closer to the stirrer axis than 20% of the length of the stirrer arm. The inventors have found that this is the best way for developing a proper vortex, and whereby during the stirring an intense internal fluid circulation is generated from the centre of the mixing vessel towards the outside, then up along the sidewalls, at the top turning towards the inner side for returning down more centrally and taking the added powder along in its flow.

In an embodiment of the present invention, several of the different ingredients are added simultaneously into the mixing vessel, while the stirring is already operating.

By introducing in parallel instead of successively several ingredients into the mixing vessel, such as the reactive polymer, the plasticizer and possibly the extender, and by at the same time stirring the liquid already present in the mixing vessel, a lot of time is saved in the overall production process, always in comparison with a conventional batch procedure in which the ingredients are successively introduced into an open mixing vessel and may only be stirred when the lid with stirrer is put onto the mixing vessel, the mixing vessel thus being closed and the pressure only then possibly being lowered in order to, as much as possible, allowing the removal of air and moisture from the gas phase as well as the air and the moisture which may have remained dissolved in the introduced liquid ingredients.

In an embodiment of the present invention the product is pumped out of the mixing vessel into a buffer tank before the product is filled into its final packaging.

The inventors have found that the use of a buffer tank allows a quick emptying of the mixing vessel such that it becomes available for the next production batch. The use of multiple buffer tanks permits the production with greater flexibility in the same mixing vessel or mixing machine of a wide product range. As such, thanks to multiple buffer tanks, one may relatively readily switch in the same mixing vessel between successive production of two final products having the same colour but different viscosities, or with different plasticizers or a difference in plasticizer amount, or with different extenders or a difference in the amount of extender, or with different filler or with a different filler content. Even switching from a batch of transparent finished product to a subsequent batch of a coloured end product or a product with filler may be performed quite easily without many special interventions thanks to the buffer tanks. The use of buffer tanks along with the closed mixing vessel brings the advantage that after a previous production batch one may switch much faster to a subsequent production batch, which may significantly boost the production volumes or production capacity of the mixing vessel.

In the embodiment of the present invention which uses a buffer tank for receiving the product from the mixing vessel, the product is preferably pumped out of the buffer tank and a pigment and/or a fungicide is mixed into the product downstream of the buffer tank, before the product is filled into its final packaging.

The mixing of pigment and/or fungicide into the product on its route to the filling installation allows the production and final packaging of a wide range of different final products starting from a few base products which may e.g. still differ in terms of their content of plasticizer, extender and/or filler.

Pumping the product from the buffer tank to the filling installation is preferably done using a piston pump. For the mixing in of the pigment and/or the fungicide, preferably is made use of a static mixer.

In the embodiment of the present invention which uses a buffer tank to receive the product from the mixing vessel, the product in the buffer tank is preferably a transparent product and the product is pumped out of the buffer tank, and the desired amount of filler is mixed into the product downstream of the buffer tank, before the product is filled into its final packaging.

The mixing in of the filler into the product on its route to the filling installation allows for the production and packaging of a number of different end products starting from one and the same transparent base product. These products may then differ in their selection and/or amount of filler.

The filler addition into the product on its route from the buffer tank to the packaging is preferably combined with the similar mixing in of pigment and/or fungicide, i.e. also into the product on its route from the buffer tank to the packaging.

In an embodiment of the present invention at least one, and preferably all, of the liquid ingredients of the production procedure, before being transferred to the mixing vessel, are preferably kept in separate feed tanks in which the atmosphere above the liquid consists of dried air. Preferably, the dried air which is supplied to the feed tank has a dew point of at most −40° C., preferably of at most −45° C., more preferably a dew point of at most 50° C.

This feature brings the advantage that the liquid ingredients of the production batch or production procedure have less opportunity to unintentionally absorb moisture before being introduced into the mixing vessel. This means that less moisture needs to be removed from the mixing vessel to prevent moisture leading to premature curing of the formed end product and also of any end product remaining from the previous production batch in the mixing vessel and on the stirrer after the introduction of the ingredients for the new production batch.

In an embodiment of the present invention the reactive polymer and cross-linker are being pre-mixed on their route to the mixing vessel.

This brings the advantage that the cross-linker and the reactive polymer are at least partially mixed before they arrive in the mixing vessel, whereby they also may already have started reacting with each other, and whereby less extra time is required for the further mixing of these two reagents, and/or for the further reaction of these two reagents to form the target moisture-curable product. This feature brings the advantage that the reaction between the two reagents occurs without any dilution by another non-reacting ingredient, such as the plasticizer and/or the extender. By performing this reaction undiluted, the reaction rate is also increased in comparison with the conventional method where the reaction takes place in the presence of an amount of plasticizer and/or extender.

Preferably this premixing is performed using a static or a dynamic mixer, more preferably a dynamic mixer which is characterised by a particular residence time. A dynamic mixer is a mixer whereby external energy may be supplied to the mixing mixture by subjecting this to shear forces. Preferably these shear forces are also controllable and adjustable. The inventors prefer a dynamic mixer over a static mixer because they found that the pressure drop across the mixer itself is lower, such that the passing requires less energy. The applicants preferably make use of the Dynamic Inline Mixer Type DLM/S-330 offered by INDAG Maschinenbau GmbH (DE).

The inventors prefer to perform the premixing even before the mixture of reactive polymer and cross-linker is stored for some time in a buffer tank upstream of the mixing vessel.

This feature brings the further advantage that even more time may be saved from the reaction time still required in the mixing vessel itself. Preferably the prepolymer reaction has substantially and more preferably almost entirely taken place before the prepolymer arrives in the mixing vessel, such that in the mixing vessel no extra time must be allowed for completing the reaction.

In the embodiment of the present invention in which the reactive polymer and the cross-linker are premixed to an at least partially end-capped polymer before this prepolymer is introduced into the mixing vessel, the at least partially end-capped polymer is preferably introduced into the mixing vessel via the lower end of the vessel. The inventors thereby prefer that the reaction between the reactive polymer and the cross-linker has already taken place as completely as practicable possible before the prepolymer reaches the mixing vessel.

Usually the ingredients are introduced into the mixing vessel through an opening in the lid or the upper wall of the mixing vessel. This feature of the present invention brings the advantage, in comparison with the conventional introduction through an opening in the upper wall of the mixing vessel, that there is a much lower risk of splashing of this end-capped polymer, which may adhere to the upper side of the equipment, such as the inner surface of the lid or the upper part of the stirrer system. End-capped polymer which becomes attached to these places may, when the thickener is introduced, which is light and readily flies up, take up a part thereof, whereby that end-capped polymer stiffens quickly into a paste and therefore may no longer run down and fall back into the liquid in the mixing vessel. This would therefore increase the amount of residue that remains in the mixing vessel from one production batch to the next, the so-called "cross-contamination". By this feature of the present invention the amount of cross-contamination between different production batches is thus strongly reduced, as well as the amount of residue which remains when opening the mixing vessel for cleaning, and which thus must be discarded primarily as waste.

In an embodiment of the present invention a thickener is introduced into a chamber wherein the already at least partially, and preferably the substantially completely end-capped polymer is introduced gradually by pushing the prepolymer through a narrow elongated opening or slot, such that a liquid curtain is formed.

This way of gradually bringing together thickener and the already end-capped polymer brings the advantage that the curtain of prepolymer makes a large surface available for absorbing the thickener. This advantage is particularly pronounced when employing silicic acid as a thickening agent, particularly in a form which is light and flies up easily, such as in the form of powder or snowflakes. Due to the large surface area the thickener readily and quickly finds its way into the liquid with the prepolymer, of which the rheology must be changed to form a paste.

This bringing together may be performed by pumping around the end-capped polymer from the mixing vessel into the chamber where it is brought into contact with the thickener, after which the mixture is routed back to the mixing vessel.

In the embodiment of the present invention wherein the reactive polymer and the cross-linking agent are premixed, the thickener is preferably added to the premixed intermediate, preferably the at least partially end-capped polymer, on its way to the mixing vessel.

Preferably prior to the addition of the thickener, an amount of solvent, extender and/or plasticizer is added to the prepolymer.

The inventors have found that the addition and incorporation of a solvent, extender and/or plasticizer is much easier before the thickener is added as compared to afterwards, because the viscosity of the prepolymer without thickener is much lower than that of the same prepolymer containing an amount of thickening agent, making the stirring to obtain a proper blending easier and less energy demanding. The inventors have further found that less thickener is required to achieve a particular viscosity when the plasticizer and/or extender is added prior to the thickener in comparison with adding the plasticizer and/or extender after the thickener.

In the embodiment of the present invention in which the thickener is added to the already at least partially end-capped polymer, the mixture from the introduction of the thickener preferably passes over an intermediate mixer, preferably a dynamic intermediate mixer because of the benefits cited before of adjustability and lower pressure drop, such that the thickener becomes even better dispersed in the liquid containing the prepolymer.

This feature brings the advantage of obtaining faster a good dispersion of the thickener in the liquid such that the pressure in the mixing vessel may also be reduced earlier without increasing the risk that undispersed thickener may be entrained in the exhaust system providing the vacuum pressure. That way the following steps in the production procedure may also be brought forward in time, such that the overall residence time in the mixing vessel is reduced and in the same mixing vessel a higher throughput may be achievable.

In an embodiment of the present invention in the mixing vessel an intermediate product is produced without filler, which may possibly first be transferred to a buffer tank, and the filler is only added to this intermediate product on its way to the filling installation.

This feature brings the advantage that the same product in the mixing vessel and/or the buffer tank offers the possibility to produce several different products. On top of the choice to add no, little or more filler to the same product from the mixing vessel, there remains the opportunity to give different colours to technically the same final product, or to adapt the amount of filler in the final product to the nature and amount of the dye or dye mixture which one desires to use in a particular final product, or conversely to match the amount of dye to the amount and nature of the filler.

Preferably the inventors add the filler as a slurry or suspension of the filler in a carrier. This is particularly convenient if the filler is being added to the product on its way from the mixing vessel to the filling installation. In this embodiment suitable carriers are best chosen from silicone oil or extender.

In an embodiment, the present invention provides a method for the production of a moisture curable composition whereby the reactive end groups of a reactive polymer are reacted with a cross-linking agent or cross-linker to form the prepolymer, characterized in that, in the reaction to form the prepolymer, the cross-linking agent is added in a stoichiometric excess with respect to the amount of reactive end groups present on the reactive polymer.

The cross-linker is a compound having at least three reactive groups, of which, during the so-called "pre-polymerization" step, provides one reactive group takes for reaction with a reactive end group of the reactive polymer to form the so-called prepolymer. As a result, at least two reactive groups are left for, later upon the application of the paste and under the influence of moisture, forming a three-dimensional structure as part of the curing reaction. The cross-linking agent itself therefore necessarily has, per molecule at least two, usually three, and sometimes even four reactive groups capable of reacting with moisture.

We found that the amount of cross-linking agent which is added in excess, performs a useful function as a possible moisture scavenger for when some moisture would prematurely find its way into the prepolymer composition. The remaining free cross-linker is available to react with the prematurely ingressed moisture, leaving less moisture for reacting with the prepolymer and thus prematurely leading to some curing of the composition. The inventors have found that the use of a stoichiometric excess of cross-linker in the pre-polymerization step significantly extends the shelf life of the final product. The excess of cross-linking agent acts as a moisture scavenger during the production of the sealant, during the filling and packaging, but also during the storage, transportation and marketing of the packaged sealant to the end user, and also afterwards, if the end user of the sealant does not use the kit immediately, or only partially, and wants to use the remaining amount some time later.

The reactive polymer typically has a straight chain structure, and each molecule has two reactive end groups. During the pre-polymerization each one of these two terminal groups reacts with one molecule of cross-linking agent. The stoichiometric ratio of "cross-linker/reactive polymer" is therefore 2.0:1. In the method according to the present invention, there is thus preferably added an excess of cross-linking agent, meaning that the molar ratio of "cross-linker/reactive polymer" should be greater than 2.0:1.

Preferably, the applicants use a molar ratio of cross-linker relative to the present number of molecules of reactive polymer of at least 3.0:1.0, preferably at least 5.0:1.0 molar, more preferably at least 10:1 molar, even more preferably at least 12:1 molar, preferably at least 15:1, more preferably at least 18:1, even more preferably at least 20:1, and still even more preferably at least 22:1 molar.

The inventors have further found that an excessively high excess of cross-linking agent may adversely affect the properties of the final product. Therefore, the inventors prefer having a molar ratio of cross-linker relative to the present number of molecules of reactive polymer of at most 60:1 molar, preferably at most 55:1 molar, more preferably at most 50:1 molar, even more preferably at most 45:1 molar, preferably at most 40:1 molar, more preferably at most 35:1, even more preferably at most 30:1, and yet more preferably at most 25:1 molar.

The most appropriate excess amount is however dependent on the ultimate sealant composition and on the care with which the composition is handled during the mixing and filling, including the additional steps taken to avoid moisture problems.

In a sealant composition with filler, the inventors e.g. prefer to use a higher excess than in a sealant composition without filler. In a so-called "filled" sealant composition the inventors apply preferably a molar ratio of "cross-linker/reactive polymer" which is at least 20% higher than in a corresponding "unfilled" sealant composition, more preferably at least 25% higher, yet more preferably at least 30% greater, and yet even more preferably at least 33% higher. As an upper limit for filled sealant compositions, the inventors prefer to use at most a 50% higher molar ratio than in a corresponding "unfilled" sealant composition, preferably at most 45% higher, more preferably at most 40% higher.

The excess amount of cross-linking agent, or the molar ratio of "cross-linker/reactive polymer", which is most appropriate for use with a particular sealant composition, within a particular method and using a particular mixing and filling installation, is therefore best determined case by case and empirically.

To determine the molar ratio of "cross-linker/reactive polymer", the applicants use, on the one hand, the molecular weight of the cross-linking agent, if this is a mixture one uses the number based average molecular weight of the cross-linker mixture. For the reactive polymer, the applicants use the average molecular weight that may be calculated based on the number of recurring monomer units. In case of an OH-terminated polydimethylsiloxane, the recurring unit is [—O—Si(CH$_3$)$_2$] having a weight of 74, so that a reactive polymer having 1000 recurring units has 1000*74+18=74018 as average molecular weight. The ingredient parts by weight used are then converted using these molecular weights into the number of employed molar units, with which the molar ratio of "cross-linker/reactive polymer" may be calculated.

In an embodiment, the present invention provides a method for the production of a moisture curable composition whereby the product comprises at least one filler, whereby the filler is obtained either by grinding or by precipitation, characterized in that the ground filler comprises at most 2000 ppmwt of water, and the precipitated filler comprises at most 8000 ppmwt of water.

The inventors have found that the use of fillers according to the present invention allows to produce a sealant having a sufficiently long shelf-life after filling and packaging, and also to keep the risk for flake formation during the production below an acceptable level.

A ground filler is typically a powder having a d50 of more than 1.0 μm, preferably at least 1.5 μm, more preferably at least 2.0 μm, yet more preferably at least 3.0 μm, and yet even more preferably at least 5.0 μm.

The ground filler preferably comprises at most 1500 ppmwt of water, more preferably at most 1000 ppm, even more preferably at most 800 ppm and yet more preferably at most 600 ppmwt of water.

A suitable example of a ground filler is ground calcium carbonate (GCC).

The precipitated filler preferably comprises at most 7500 ppmwt of water or moisture, more preferably at most 7000 ppmwt of water, even more preferably at most 6500 ppm, yet more preferably at most 6000 ppm, preferably at most 5500 ppm, more preferably at most 5000 ppmwt, preferably at most 4000 ppm, more preferably at most 3000 ppm, even more preferably at most 2500 ppm, and yet more preferably at most 2000 ppmwt of water or moisture.

A suitable example of a precipitated filler is precipitated calcium carbonate (PCC).

In theory, the most suitable filler for the method according to the present invention has no residual moisture at all, and would thus comprise less than 1 ppm of water. This level is however practically and economically not quite achievable for the producers. The inventors have found that the following lower limits for the water content of the fillers are workable and therefore represent their preference.

The ground filler preferably comprises at least 100 ppmwt of water, more preferably at least 300 ppm, even more preferably at least 500 ppm.

With precipitated fillers, the practical and economically feasible lower limit is somewhat higher. Preferably, the precipitated filler comprises at least 1000 ppm water, more preferably at least 1500 ppm, still more preferably at least 2000 ppm.

Allowing in the filler an amount of water, small but acceptable for the process, offers the advantage that the method for the production of the filler may be simpler, which improves the availability of the filler from a wider range of sources and providers, such that a wider choice of possibilities comes available at economically more favourable conditions.

In an embodiment, the method according to the present invention comprises the pneumatic transport of the filler to the mixing apparatus, where the filler is to be mixed into at least one of the liquid ingredients required to obtain the final product. In the embodiment with the pneumatic transport, the carrier for the pneumatic transport preferably is a gas having a dewpoint of at most 0° C., preferably of at most −10° C., more preferably of at most −20° C., even more preferably of at most −30° C., yet more preferably of at most −40° C., and preferably at most −45° C.

Several gases are suitable as the carrier for this pneumatic transport, such as natural gas, methane, CO$_2$ or nitrogen. Preferably, however, the inventors use nitrogen or air for the pneumatic transport. This offers the advantage that the gas is non-flammable, such that the risk for fire or explosion is kept as low as possible, both during the transport as in the supply, the treatment and the disposal of the gas.

Even more preferably the inventors use air for the pneumatic transport, whereby, preferably, ambient air is being pressurized and dried to the desired dew point before employing the air for the pneumatic transport. The air may e.g. be dried by passing the air over a moisture adsorbent such as a molecular sieve or silica gel.

Preferably, the inventors dry the air by cooling it down to a temperature of at most the required dew point, whereby the excess moisture in the air condenses and may physically be separated off, and whereby a dried air is obtained having a moisture level of at most the desired dewpoint. The advantage of this drying method is that the installation may be operated continuously, and that there is no moisture adsorbent which needs to be regenerated when this agent has at least partially become saturated with moisture.

The inventors determine the dew point of a gas preferably by means of a polymeric sensor, such as the Dewpoint transmitter testo 6740 available from the company Testo Inc., with headquarters in Germany.

The water content of a filler is determined by the inventors preferably using the analytical method according to DIN 51777, based on a titration according to the Karl-Fischer analytical method and adapted for samples of powders or other solid materials, and it is expressed relative to the entire weight of the filler.

In an embodiment of the present invention, the filler is selected from the group consisting of calcium carbonate, preferably ground calcium carbonate (GCC), dolomite, with which a mixture of mainly calcium and magnesium carbonate is meant, and precipitated calcium carbonate (PCC).

In an embodiment of the present invention, the filler is a precipitated filler. Preferably, the precipitated filler has a rather small particle size, preferably a d50 of at most 1 µm, more preferably at most 500 nm, even more preferably at most 200 nm, yet more preferably at most 100 nm, and still more preferably at most 80 nm.

In an embodiment of the present invention, the filler is coated. The inventors have found that coated versions of fillers comprise less moisture at the end of their production, and also have a lower tendency to absorb moisture after their production, such as during storage, handling or transport. The inventors have also found that coated fillers may enforce the end product, i.e. that they may positively affect the mechanical properties of the final product. For example, the inventors have found that coated types of filler may provide a higher "Fmax" to the final product. With Fmax is meant the highest tensile strength measured in a tensile test. Beyond the Fmax point on the tensile curve, the sample yields. The Fmax is therefore also sometimes referred to as the "tensile strength at break", although with sealants it is not necessarily the moment of fracture. The inventors have found that this effect on the mechanical properties of the sealant is more pronounced with precipitated fillers, such as coated PCC. The inventors have also found that this beneficial effect is more noticeable in hybrid systems, which as explained above are SMP-based systems.

The inventors have found that by using coated fillers the amount of thickening agent may be reduced in order to obtain a product with comparable rheology. Under particular circumstances, such as with coated PCC, one may even obtain a suitable paste without the use of a thickening agent.

In an embodiment, the present invention provides a method for the production of a moisture curable composition, whereby a product is filled into a plastic cartridge as final packaging and the cartridge after filling is closed by introducing into the open end of the cartridge a "kolb" or plunger, characterized in that on the inner side of the cartridge, at least on the location where the kolb has to come into contact with the cartridge, is provided a layer of lubricant. The layer of lubricant provides in the first place a good seal between the plunger and the cartridge, such that air or moisture may not readily find its way to the product inside the cartridge and whereby the shelf life of the filled cartridge is extended. The lubricant layer brings the additional advantage that the plunger may be pushed in more readily and with less force when extruding the product out of the cartridge. In addition, the layer of lubricant reduces the risk that the plunger would turn during the use of the filled cartridge, and consequently, that air and/or moisture might penetrate into the cartridge and lead to premature cross-linking of the product inside the cartridge.

The terms "kolb" and "plunger" are in this document used interchangeably, and as synonyms for each other.

Preferably, this layer of lubricant has a thickness of not more than 0.20 mm, more preferably at most 0.15 mm, even more preferably at most 0.10 mm, yet more preferably at most 0.05 mm. Optionally, this layer preferably has a thickness of at least 0.01 mm, preferably at least 0.02 mm, even more preferably at least 0.03 mm, yet more preferably at least 0.05 mm, preferably at least 0.07 mm, and more preferably at least 0.10 mm.

Many substances or compositions are suitable as the lubricant for the inner wall of the cartridge.

A preferred requirement is that the lubricant comprises little or no water, preferably at most 100 ppmwt of water, more preferably at most 10 ppmwt.

The lubricant preferably also has a low volatility, e.g. expressed as a low vapour pressure at room temperature (23° C.), preferably having a vapour pressure at room temperature of at most 1.0 hPa, more preferably of at most 0.50 hPa, and even more preferably of at most 0.10 hPa. Suitable lubricants are for instance silicone oils, but also possibly high-boiling hydrocarbons, preferably high boiling saturated hydrocarbons, such as paraffins or isoparaffins, although the lubricating power of these hydrocarbons only becomes sufficiently important at a sufficiently high molecular weight or carbon number, such that a desired fluidity at a given temperature may often more readily be obtained with branched hydrocarbon chains than with their straight-chain variants.

Often also suitable as a lubricant for the kolb or plunger is one of the plasticizers which is selected from the formulation of the composition which is filled in the cartridge. The latter are preferred by the applicants because of their compatibility with the composition itself. Mainly for reasons of compatibility, the inventors preferably use in silicone sealants silicone oil to lubricate the kolb. In hybrid and/or PUR-based mastics, often the plasticizer which is used in the formulation of the sealant is used as the lubricant. The lubricant may be liquid at room temperature, or solid. The inventors prefer to use a lubricant which is liquid at ambient temperature (10° C.), such that it may be applied at low temperature, with little or no use of heating.

In an embodiment, the lubricant is a silicone oil, preferably a non-reactive polysiloxane, more preferably a non-reactive polydimethylsiloxane. The silicone oil brings the advantage that the lubricant is chemically inert and very stable, and also quite compatible with the moisture-sensitive product in the cartridge, particularly when this sealant is a silicone based, or in technically more correct terms based on siloxanes. In an embodiment, the silicone oil is sprayed or nebulized into the still empty cartridge. In another embodiment, the lubricant is dripped onto the plunger, on its way to where it is to be inserted into the cartridge.

In an embodiment, the cartridge is pre-lubricated with a thin layer of wax as the lubricant, preferably a hydrocarbon wax, more preferably a saturated hydrocarbon wax. The wax may for instance be a polyethylene wax or a mineral wax obtained from the heavy fractions from petroleum distillation. The wax may also be a triglyceride. Preferably the lubricant is applied in the form of an aqueous or solvent-containing dispersion or emulsion. This is then preferably sprayed into the rear of the cartridge. After application the water or the solvent evaporates and the wax stays behind to serve as a lubricant when the kolb or plunger is inserted into the cartridge.

In an embodiment, the present invention provides a method for the production of a moisture curable composition whereby the reactive end groups of a reactive polymer are reacted with a cross-linking agent for forming a prepolymer, whereby into a mixing vessel at least a part of the ingredients is introduced and mixed, whereby they react with each other as needed in the mixing vessel and whereby, at least during part of the method, the content of the mixing vessel is put under a vacuum pressure, whereby the mixing vessel is provided with an outlet mouth, and whereby during the filling, the mixing and/or the reaction the outlet mouth is sealed by means of a plastic foil.

The inventors have found that a plastic foil as an additional sealing element may achieve a much better sealing for the vacuum pressure in the mixing vessel as compared to alternatives such as only a rubber sealing ring and/or a closing valve, whereby the risk is reduced that, under the influence of the vacuum pressure in the mixing vessel, ambient air and hence also moisture, may enter through the outlet mouth into the mixing vessel and cause a premature curing of the moisture-sensitive content of the mixing vessel.

The outlet mouth is preferably in addition further closed with a lid, preferably a screwed-on lid, whereby the lid is preferably additionally sealed by means of a sealing ring, preferably a rubber sealing ring. The inventors have found that the plastic foil suitably avoids direct prolonged contact between the sealing ring and the content of the mixing vessel, which reduces the risk of chemical damage to the sealing ring, as well as simplifies the cleaning of the sealing ring and of the lid sealing the outlet mouth.

In an embodiment, to remove the mixed and reacted end product from the mixing vessel, the plastic foil which closes the outlet mouth is removed or punctured. Preferably the puncturing is performed through a suitable valve with which the outlet mouth is connected and through which the mixing vessel is then connected to the filling installation for filling and packaging the content of the mixing vessel. This feature brings the advantage that the possibility for the product in the mixing vessel to come in contact with moisture via the outlet mouth, and the time period during which this contact would be possible, may be reduced substantially.

In an embodiment, the plastic foil consists of a thermoplastic and the thermoplastic foil is heat welded, like a membrane, onto the outlet mouth or preferably onto an additional plastic intermediate piece which is mounted onto the outlet mouth, preferably this intermediate piece being screwed onto the outlet mouth. Preferably, the foil is made of polyethylene (PE). The inventors have found that a welded foil provides a better sealing than possible alternatives, such as gluing or the use of an additional rubber seal. The welded foil is also simpler and more economical because there are no additional elements needed in order to achieve the sealing, even though the step of welding is an additional step in the overall process.

Providing the plastic foil onto an additional intermediate piece brings the advantage that the assembly of the intermediate piece with the applied plastic foil may be prepared separately, and may then be fitted quickly and easily onto the outlet mouth, such as by screwing, before the lid—with its sealing ring—is put in place. The membrane offers the additional advantage that it may possibly even replace the shut-off valve during the mixing. The use of valves implies the risk that the valve comprises mechanical parts which are, by themselves or in conjunction with other components, not really vacuum-tight.

In an embodiment, the present invention provides a method, for the production of a moisture curable composition, using the mixing vessel for the production of the prepolymer by the reaction of the reactive polymer with the cross-linking agent, whereby after the introduction of at least one liquid reagent for the reaction or another liquid ingredient of the formulation, the content of the mixing vessel is stirred and the content of the closed mixing vessel is put under a vacuum pressure, whereby the vacuum pressure is at most 0.50 bar absolute (bara), preferably at most 0.40 bara, more preferably at most 0.30 bara, and even more preferably at most 0.20bara, preferably at most 0.15 bara, more preferably at most 0.10 bara, even more preferably at most 0.05 bara, preferably at most 0.03 bara, more preferably at most 0.02 bara, and even more preferably at most 0.01 bara.

The inventors have found that putting the closed mixing vessel under a vacuum pressure is a fast and convenient way to remove a large portion of the remaining air from the mixing vessel, with the humidity contained therein, such that this quantity of moisture cannot react with any end-product which may have been left behind in the mixing vessel after the previous batch production, whereby that end-product might cure, and could form undesired flakes. The stirring of the contents of the mixing vessel during the period under reduced pressure ensures a homogenization of the contents of the mixing vessel, and also a ready reduction of any moisture which may still be dissolved in the liquid inside the mixing vessel, because the concentration of dissolved moisture may thereby over the entire liquid content remain in equilibrium with the low vapour pressure of water in the gas phase above the liquid level. For this reason, the effect of this feature is more pronounced when the vacuum pressure is set lower, within the capabilities of the equipment. Preferably, the equipment is able to readily achieve the prescribed pressure, but it is not necessary to go further down below at least 0.001 bara or 1 mbar absolute, preferably at least 0.010 bara, more preferably at least 0.025 bara and even more preferably at least 0.050 bara. This brings the advantage that the installation which has to provide the vacuum pressure, may require fewer steps in series and may thus be designed in a simpler way.

The inventors prefer, after closing the mixing vessel, to decrease the vacuum pressure as soon as practically possible down to the prescribed value. For instance, the inventors prefer to achieve a vacuum pressure of at most 0.40 bara within 60 seconds after closing the mixing vessel, preferably within 45 seconds, more preferably within the first 30 seconds.

The inventors prefer to reach a vacuum pressure of at most 0.20 bara within a time span of 120 seconds, preferably within 90 seconds, and more preferably within 60 seconds. The inventors have found that this method ensures in a sufficient and workable manner that there is as little as possible moisture capable to react with the final product in the mixing vessel that remained from the previous production batch.

In an embodiment of the present invention the mixing vessel is closed by assembling the mixing vessel and the lid, characterized in that in between the mixing vessel and the lid a sealing ring is provided, and the material of the sealing ring has a Shore A hardness according to ASTM D2240 of at least 30 and at most 80, preferably at least 50. The inventors have found that a sealing ring having these characteristics, when used carefully, may provide a good sealing, and this over a long period of time, whereby the same sealing ring may be reused several times. The inventors have also found that the risk for damage is lower during manipulation of the ring, both during use as during cleaning between two uses.

Preferably, the material of the sealing ring exhibits a good resistance not only against the ingredients of the sealant, but also against all the intermediate products and against the final product. The inventors have experimentally found that silicone rubber, polytetrafluoroethylene (PTFE), polypropylene (PP), polyethylene (PE), ethylene/propylene/diene monomer plastic (EPDM) are possibly suitable candidates.

Preferably however, the sealing ring is made from a compound which is a mixture of polypropylene (PP) and ethylene/propylene/diene monomer plastic (EPDM). The inventors have found that this latter compound provides a good chemical resistance against the extenders and solvents used.

In an embodiment of the present invention, the lid of the mixing vessel comprises an inspection window and the mixing vessel comprises an outlet mouth which has temporarily been closed off with a cover, the method comprising the visual observation through the inspection window whether air bubbles rise through the liquid and whether the air bubbles are originating from a leaking cover on the outlet mouth, characterized in that an elastic sleeve is pulled over the cover on the outlet mouth and its connection with the outlet mouth, preferably a latex glove.

The inventors have found that the pulling of an elastic sleeve over the cover and over its connection with the outlet mouth, may be carried out quite readily and quickly, and that this procedure is usually sufficient to stop the intrusion of ambient air into the mixing vessel via the outlet mouth. This avoids a more complex procedure in which the mixing vessel may have to be replaced, including the transfer of the contents of the mixing vessel with its not well sealing cover on the outlet mouth, to an empty, preferably cleaned, second mixing vessel. This more elaborate procedure increases the risk for contact with moisture between reactive residue which may be present in the mixing vessel, and therefore the potential formation of undesirable flakes. The prescribed procedure may be incorporated as a standard procedure as part of the process, but may also be reserved as an intervention for in case a problem occurs when obtaining the set and desired vacuum, whereby the desired value may be obtained more readily without other and more elaborate measures.

In an embodiment of the present, after the stirring to homogeneous of the liquid in the mixing vessel, containing the reactive polymer, and also after deaerating the closed mixing vessel by putting the vessel under a vacuum pressure, the method comprises the addition into the mixing vessel of the cross-linking agent for reaction with the reactive end groups of the reactive polymer and thereby forming the prepolymer, and possibly on top of that the addition of an extender to the content of the mixing vessel, characterized in that the mixing vessel before and preferably also during the addition of the cross-linking agent is put under an overpressure, preferably under an overpressure of at least 0.1 barg, more preferably of at least 0.2 barg, even more preferably an overpressure of at least 0.3 barg.

The inventors have found that putting the mixing vessel, i.e. its content, under an overpressure before, and preferably also during, the addition of the cross-linking agent, brings the advantage that the risk of losing cross-linking agent in the gas phase, as well as the amount of cross-linking agent that may be lost via the gas phase, may be reduced. This means that more of the added amount of cross-linking agent may be employed usefully, and therefore less excess may need to be added. Because the cross-linking agent is a reactive agent, this feature also brings the advantage that fewer problems may be caused by the cross-linking agent which ends up in the exhaust system.

In case at least one of the ingredients of the composition, e.g. a filler, is added by means of pneumatic transport, the overpressure is preferably achieved by the addition of at least one of the gases that are used for the pneumatic transport. It should be noted that a wide range of gases are suitable in this context. However, the inventors prefer to use non-combustible gases such as nitrogen or air. Preferably, the inventors use dried or dry air to obtain this overpressure, for the reasons mentioned elsewhere in this document.

The cross-linking agent may be added by pouring a pre-measured amount thereof through an open manhole or inspection hole in the lid of the mixing vessel. In this case, in accordance with the present invention, the mixing vessel is put under the light overpressure, which falls back to atmospheric pressure when the manhole or inspection hole is opened in order to enable the addition of the cross-linking agent. The mixing vessel is then closed again after addition of the cross-linking agent.

In an alternative embodiment, the cross-linking agent may be pumped into the mixing vessel. In this case, the mixing vessel does not need to be opened, and in accordance with the present invention the mixing vessel is put under a light overpressure, preferably not only before but also during the addition of the cross-linking agent.

When the cross-linking agent has been incorporated into the rest of the fluid contents of the mixing vessel, and the reaction has started, the inventors prefer to install a vacuum pressure in the closed mixing vessel during the reaction of the cross-linking agent with the reactive polymer. This vacuum pressure is preferably at most 0.50 bar absolute (bara), preferably at most 0.40 bara, more preferably at most 0.30 bara, even more preferably at most 0.20 bara, preferably at most 0.15 bara, more preferably at most 0.10 bara, even more preferably at most 0.05 bara, preferably at most 0.03 bara, more preferably at most 0.02 bara, and even more preferably at most 0.01 bara. For reasons explained elsewhere in this document, this vacuum pressure should be at least 0.001 bara or 1 mbar absolute, preferably at least 0.010 bara, more preferably at least 0.025 bara and even more preferably at least 0.050 bara The inventors have found that the cross-linking agent is more valuable and more volatile than the reactive polymer. By adding the cross-linking agent to a mixing vessel which is put under an overpressure, rather than to a mixing vessel which is put under vacuum pressure, reduces the risk that cross-linking agent, or extender if present, especially if the latter is rather volatile, ends up in the vacuum system which provides the temporary vacuum in the mixing vessel, would become lost and may lead to problems in the vacuum system and the piping leading to it. Another problem which is avoided is that the volatile cross-linking agent, which ended up in the liquid, under the vacuum pressure would evaporate such that the volume of liquid might increase rapidly and extensively, and through which liquid could end up against the inside of the lid of the mixing vessel, which liquid then may participate to a lesser extent in the reaction to form the prepolymer. In addition, any loss of cross-linking agent from the composition represents a loss of shelf life for the composition. The present invention, therefore, also contributes to achieving and/or maintaining the desired shelf-life of the composition.

The method according to the present invention includes that the vacuum pressure in the closed mixing vessel, which is also sometimes referred to as "the vacuum", is to be broken by admitting a gas into the mixing vessel. In an embodiment of the present invention, dried air is admitted into the mixing vessel, preferably air having a dew point of at most −40° C., preferably at most −45° C., more preferably a dew point of at most −50° C.

The inventors have found that the use of dried air to bring the pressure in the mixing vessel back up from the vacuum pressure during the earlier stage of the production batch to the light overpressure during the addition of the cross-linker, brings the advantage of being safer compared to other gases which could be used to elevate the pressure again in the mixing vessel, without also introducing moisture into the mixing vessel, the latter being the problem with the conventional method of breaking the vacuum using ambient air. The exposure of operating personnel to dried air holds less safety risks compared to other gases such as nitrogen or natural gas, because the dried air still contains sufficient oxygen such that there is no risk of oxygen insufficiency, and also because the dried air in itself does not represent a fire risk.

After the addition of the cross-linking agent to the reactive polymer in the mixing vessel, the inventors prefer to briefly disperse the cross-linker into the contents of the mixing vessel. During the dispersion, the inventors prefer to maintain a light overpressure in the mixing vessel within the range of 0:05 to 0.30 barg, preferably of at least 0.08 barg and/or at most 0.20 barg, more preferably of about 0.10 barg. In this way, the inventors avoid the risk that a part of the cross-linking agent would evaporate and might not be able to participate in the reaction. After this dispersion, the inventors preferably maintain a reaction time, whereby more preferably the mixing vessel is put again under vacuum, preferably a vacuum pressure as described above.

In an embodiment of the present invention, the rotating speed of the stirrer in the mixing vessel during the reaction of the cross-linking agent with the reactive polymer is limited to at most 300 rotations per minute (=rpm), preferably at most 150 rpm.

The limitation of the rotating speed during the reaction reduces the risk of splashing liquid. The splashing liquid may adhere to the inside of the lid of the mixing vessel, whereby said portion of the liquid does not leave the mixing vessel when it is emptied through the outlet mouth. As a result, this liquid is lost for the batch which is in production. In addition, this liquid will remain in the lid when the lid is removed from the mixing vessel, upon which the liquid is able to react with humidity and start curing, which gives rise to the formation of undesirable flakes. Reducing the rotating speed during the reaction, thus reduces the risk of flake formation. An additional advantage is that through lowering the rotating speed, also energy is saved. A further advantage is that the heating of the contents of the mixing vessel, caused by the action of the shear forces on the fluid, is reduced.

In an embodiment of the present invention, after mixing of the cross-linking agent into the liquid in the mixing vessel, and preferably only after the dispersion of the cross-linking agent, the mixing vessel is again put under a vacuum pressure, whereby the vacuum pressure is preferably at most 0.5 bar absolute (bara), more preferably 0.3 bara, even more preferably 0.2 bara.

The inventors have found that this reduction of the pressure in the mixing vessel, by extraction of gas from the gas phase in the mixing vessel, removes even more moisture from the reacting mixture in the mixing vessel. This moisture might have entered through the manhole or any other opening in the mixing vessel or in the lid, a manhole which is usually provided in the lid of the mixing vessel, and which may had to be opened to enable the addition of the cross-linker. Preferably, the cross-linker is added as a quantity of liquid which is first accurately measured, and is then added to the contents of the mixing vessel. If therefore the liquid must be brought in contact with the ambient air, one preferably works quickly to reduce the length of this exposure.

EXAMPLE

The following example is developed in more detail to illustrate the present invention. The example describes the production and packaging of a silicone sealant in accordance with the following recipe:

TABLE 1

| Ingredient (wt parts) | Detail | EX |
|---|---|---|
| Reactive polymer | Polymer FD 80 | 60 |
| Plasticizer | Silopren W1000 | 12 |
| Extender | Exxsol D140 | 15 |
| Cross-linker | ES23 | 4 |
| Thickening agent | Aerosil ® 150 | 8 |
| Adhesion promoter | Haftvermittler DBS | 1 |
| Catalyst | Dibutyl tin diacetate | 0.025 |

The example is for a transparent sealant with an acetoxy-based cross-linker.

Polymer FD 80 was obtained from the company Wacker (DE). Polymer FD 80 was obtained from the company Wacker (DE). Polymer FD 80 had an average molecular weight of 70318 g/mol. Silopren® W1000 was obtained from the company Momentive Performance Chemicals. Exxsol® D140 was obtained from the company ExxonMobil Chemical.

Cross-linker ES23 was ethyl triacetoxy silane obtained from the company Wacker, having a molecular weight of 234,28 g/mol.

Adhesion promoter ("Haftvermittler") DBS was di-tert-butoxy-diacetoxy silane, which was obtained from the company Wacker.

AEROSIL® 150 was a pyrogenic form of silicic acid obtained from the company Evonik.

The dibutyl tin diacetate was obtained from the company Momentive Performance Materials.

EXAMPLE

Production of a Silicone Sealant Based on an Acetoxy-Containing Cross-Linker

In a closed mixing vessel a vacuum pressure of about 0.2 bara was installed. The mixing vessel was equipped with a height-adjustable stirrer system, whereby the stirrer was provided with scrapers reaching up to a distance of at most 2 mm away from the side walls of the mixing vessel, and was further provided with additional surfaces to cause more turbulence in the bulk of the liquid contents of the mixing vessel.

In a buffer tank with weighing equipment was first added from a feed tank the prescribed amount of reactive polymer. Also the plasticizer, the extender and the cross-linker were supplied from feed tanks. The feed tanks were continuously kept under an atmosphere of air having a dew point of –50° C.

The polymer from the buffer tank and the ingredients from the feed tanks, the latter under coriolis flow control to enable a correct dosing, were routed simultaneously into the mixing vessel under vacuum pressure, and this while the stirrer was operating.

After the reaction of the cross-linker with the reactive polymer, the vacuum was broken and a light overpressure of 0.05 barg was installed, after which the prescribed amount of thickener was added and dispersed in the liquid. The thickener was pneumatically introduced using as the carrier an air flow having a dew point of –50° C.

During the dispersion of the thickener, the mixing vessel content was again put under a vacuum pressure of about 0.2 bara. After dispersing the thickener, the adhesion promoter and catalyst were added and mixed in. After completion of the mixing procedure, the mixing vessel was emptied by pumping the content to a buffer tank, and this while the vacuum pressure was maintained. During the emptying the stirrer was used to scrape substantially clean the inner walls and the bottom of the mixing vessel.

Afterwards the buffer tank was put under pressure using a movable pressure plate which has been provided therein and the contents of the buffer tank were pumped towards the filling installation using a piston pump. On its way to the filling installation where the paste was filled into its commercial packaging, if desired, the filler, more particularly in the form of a slurry using some of the plasticizer as carrier, the pigment, and if desired also a fungicide, may be injected in-line and blended using a static mixer.

The mixing vessel remained closed during the entire operation, i.e. the lid was kept on the mixing vessel and no manhole or opening to the ambient air was opened, such that in such way no moisture could enter the mixing vessel.

After emptying the mixing vessel, the next production batch was immediately started by transferring new amounts of ingredients to the mixing vessel.

The product was filled into plastic cartridges which were closed off by placing a kolb or plunger in the open end of the cartridges after filling. The plastic cartridge was on the inner side, where the plunger was to come in contact with the cartridge, pre-lubricated by providing a layer of a heavy hydrocarbon wax, preferably a wax which by hydrogenation was made more stable against the influences of oxygen and/or UV radiation, preferably a layer having a thickness of about 0.10 mm. This wax may have been applied in every way known to the skilled person. The wax may be sprayed in molten form as a hot liquid, in solution in a more volatile organic solvent, or as an emulsion in a carrier. Such an emulsion may even be water-based, whereby the water readily evaporates and is no longer annoying or even present to an extent that it may affect the content of the cartridge.

The inventors have found that the products, which were produced and packaged according to the present invention, when treated normally, may reach a shelf-life which amply enables to guarantee a shelf life of 12 months.

Having now fully described this invention, it will be appreciated by those skilled in the art that the invention can be performed within a wide range of parameters within what is claimed, without departing from the scope of the invention, as defined by the claims.

The invention claimed is:

1. A method for the production in batch of a moisture curable composition comprising the step of forming a prepolymer by reacting a reactive polymer that is having reactive end groups by reacting the reactive end groups of the reactive polymer with a cross-linking agent, wherein the method is operated in batch mode and the forming of the prepolymer occurs in a mixing vessel that is closed by assembling the mixing vessel with a lid and which contains a gas phase above the liquid level, wherein the reactive polymer and the cross-linking agent, as well as any additional ingredients deemed necessary for the step of producing the moisture curable composition in the mixing vessel, are introduced into the closed mixing vessel and react without removing the lid from the mixing vessel, and the mixing takes place without removing the lid from the mixing vessel, and the moisture curable composition product is removed from the mixing vessel without removing the lid from the mixing vessel, and the mixing vessel remains closed by keeping the lid on the mixing vessel between successive production batches.

2. The method according to claim 1, and the lid of the mixing vessel is provided with an in height adjustable stirring system such that, without having to open the mixing vessel by lifting the lid, the height of the stirrer may be adjusted relative to the liquid level in the mixing vessel.

3. The method according to claim 1, wherein the content of the mixing vessel is kept under a vacuum pressure during the introduction of the reactive polymer and of the cross-linking agent.

4. The method according to claim 1, wherein a thickener is introduced into the mixing vessel, and wherein the mixing vessel is kept under about atmospheric pressure during the addition of the thickener, and, if a vacuum pressure is present in the mixing vessel, this vacuum pressure is broken prior to the addition of the thickener.

5. The method according to claim 1 wherein the mixing vessel is kept under a vacuum pressure while the moisture curable composition product is removed from the mixing vessel by pumping the product out of the mixing vessel.

6. The method according to claim 1 wherein the mixing vessel is provided with sidewalls and with a stirrer and the stirrer is provided with arms, wherein the arms of the stirrer in the mixing vessel are provided with scrapers extending up to a distance of at most 5 mm removed from the sidewalls of the mixing vessel.

7. The method according to claim 1 wherein at least two of the reactive polymer, the cross-linking agent, and any additional ingredients are introduced simultaneously into the mixing vessel, and if the mixing vessel is provided with a stirrer, after the stirrer has been activated.

8. The method according to claim 1 wherein the product is pumped out of the mixing vessel into a buffer tank before the product is filled into its final packaging.

9. The method according to claim 8 wherein the product is pumped out of the buffer tank and a pigment and/or a fungicide is mixed into the product downstream of the buffer tank, before the product is filled into its final packaging.

10. The method according to claim 1 wherein at least one of the liquid ingredients of the production process, before its introduction into the mixing vessel, is kept in a separate feed tank wherein the atmosphere above the liquid consists of dried air.

11. The method according to claim 1 wherein the reactive polymer and the cross-linking agent are premixed on their way to the mixing vessel and react to form an at least partially end-capped polymer.

12. The method according to claim 1 wherein in the mixing vessel an intermediate product is produced without filler.

13. The method according to claim 1 wherein, for the reaction to form the prepolymer the cross-linking agent is added in a stoichiometric excess relative to the amount of reactive end groups present in the reactive polymer.

14. The method according to claim 1 wherein the reactive polymer is reacted with the cross-linking agent in the mixing vessel, wherein the mixing vessel is containing a liquid which is containing the reactive polymer and wherein, after the step of the stirring to homogeneous of the liquid in the mixing vessel, and also after the step of deaeration of the closed mixing vessel by putting the content of the vessel under a vacuum pressure, the method comprises the step of the introduction into the mixing vessel of the cross-linking agent for reaction with the reactive end groups of the reactive polymer and thereby forming the prepolymer wherein the content of the mixing vessel before the introduction of the cross-linking agent is put at an overpressure.

15. The method according to claim 1 wherein during the reaction of the cross-linking agent with the reactive polymer a vacuum pressure is employed.

16. The method according to claim 1 wherein the closed mixing vessel is at least temporarily placed under a vacuum pressure, wherein this vacuum pressure is broken by letting a gas into the mixing vessel.

17. The method according to claim 1 wherein the cross-linking agent is added to the mixing vessel, wherein the cross-linking agent is dispersed into the content of the mixing vessel and during the dispersion a light overpressure is maintained in the mixing vessel in the range of 0.05-0.30 barg.

18. The method according to claim 1 wherein, after mixing of the cross-linking agent into the liquid in the mixing vessel, the mixing vessel is put under a vacuum pressure.

19. The method according to claim 1 wherein the moisture curable composition product is filled into a plastic cartridge as final packaging and the cartridge after filling is closed by introducing into the open end of the cartridge a plunger, wherein on the inner side of the cartridge, at least on the location where the plunger has to come into contact with the cartridge, is provided a layer of lubricant.

20. The method according to claim 19 wherein the lubricant contains at most 100 ppm water.

\* \* \* \* \*

UNITED STATES PATENT AND TRADEMARK OFFICE
CERTIFICATE OF CORRECTION

Page 1 of 1

PATENT NO. : 10,907,015 B2
APPLICATION NO. : 16/096652
DATED : February 2, 2021
INVENTOR(S) : P. Bruggeman et al.

It is certified that error appears in the above-identified patent and that said Letters Patent is hereby corrected as shown below:

In the Claims

| Column | Line | |
|---|---|---|
| 29 | 66 | Claim 2: Please delete "and" |

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*